US006734247B2

(12) United States Patent
Donn et al.

(10) Patent No.: US 6,734,247 B2
(45) Date of Patent: May 11, 2004

(54) TRANSPARENT HIGH IMPACT ALLOY

(75) Inventors: Allen Maxwell Donn, Chesapeake, VA (US); Richard Albert Cooper, Chesapeake, VA (US)

(73) Assignee: Nova Chemicals Inc., Pittsburgh, PA (US)

( * ) Notice: Subject to any disclaimer, the term of this patent is extended or adjusted under 35 U.S.C. 154(b) by 0 days.

(21) Appl. No.: 10/020,614

(22) Filed: Dec. 13, 2001

(65) Prior Publication Data

US 2003/0139519 A1 Jul. 24, 2003

(51) Int. Cl.$^7$ .................................................. C08J 0/00
(52) U.S. Cl. ........................ 524/500; 524/506; 525/89; 525/93; 525/94; 525/95
(58) Field of Search ........................... 524/306; 525/89, 525/93, 94, 95

(56) References Cited

U.S. PATENT DOCUMENTS

| | | |
|---|---|---|
| 4,990,565 A | 2/1991 | Blasius, Jr. |
| 5,079,296 A | 1/1992 | Thompson et al. |
| 5,237,007 A | 8/1993 | Colella |
| 5,252,664 A | 10/1993 | Thompson et al. |
| 5,290,862 A | 3/1994 | Blasius |
| 5,294,677 A | 3/1994 | Hauser et al. |
| 5,336,719 A | 8/1994 | Thompson et al. |
| 5,344,878 A | 9/1994 | Colella et al. |
| 5,556,917 A | 9/1996 | Colella et al. |
| 5,777,030 A | 7/1998 | Hanes et al. |
| 6,040,382 A | 3/2000 | Hanes |

OTHER PUBLICATIONS

Souheng Wu; "Control of Intrinsic Brittleness of Polymers and Blends by Chemical Structure: A Review"; Polymer International; Vol 29, No. 3, 1992, Printed in Great Britain 1992 ; pp. 229–247.

*Primary Examiner*—Edward J. Cain
(74) *Attorney, Agent, or Firm*—Suzanne Kikel

(57) ABSTRACT

An improved tough, transparent polymer alloy comprised of 90 to 20 weight percent of a brittle polymer with a weight average molecular weight greater than 180,000; 0 to 60 weight percent of a rubbery polymer; 0 to 80 weight percent of a ductile polymer; and between greater than 0.4, i.e. between 0.5 and 3 weight percent of a plasticizer, i.e. mineral oil which resides in the brittle polymer. The brittle polymer can have molecular weights between 220,000 and 300,000, and may be as high as 400,000. In one of the preferred embodiments the brittle polymer is a copolymer of styrene and methyl methacrylate which copolymer ranges between 50 and 55 weight percent, the rubbery polymer is 0 weight percent, the ductile polymer is a styrene butadiene block copolymer ranging between 45 and 50 weight percent, and the mineral oil is 1.5 weight percent. Notched IZOD impact strength ranges between 1.0 to 6.0 ft-lb./in., preferably between 2.0 and 4.5 ft-lb./in. The haze can be less than 1.5% or it can be between 1 and 4%.

27 Claims, No Drawings

TRANSPARENT HIGH IMPACT ALLOY

BACKGROUND OF THE INVENTION

1. Field of the Invention

The invention relates to a polymer alloy comprising a brittle polymer and either a ductile polymer, a rubbery polymer, or a ductile polymer and a rubbery polymer. More particularly, the invention pertains to a polymer alloy comprising at least a brittle polymer component having a weight average molecular weight greater than 180,000 and a plasticizer in an amount greater than 0.4 weight percent. The polymer alloy gives improved toughness with excellent transparency and/or improved low haze with improved toughness and stiffness.

2. Background Art

It is known in the art that some physical properties of styrenic or acrylic type polymers may be improved by alloying them with one or more additional polymers. In some cases, the resulting mixture can have improved mechanical properties, such as improved impact strength or toughness. However, as impact strength or toughness is improved, the stiffness of the alloy usually is decreased.

Chemical Abstracts 109:171278v [Polym. Prepr. (Am. Chem. Soc., Div. Polym. Chem.) 1988, 29(2), 180-1] discloses that physical blends of block SBR (styrene content: 75.2 weight percent) and a copolymer of methyl methacrylate and styrene are mechanical properties of the blend are partially compatible. The morphological and mechanical properties of the blend are strongly dependent on the molding/mixing process used to produce the blend. The SBR could only be toughened when the ideal morphology of the blend was obtained.

Chemical Abstracts 106:85901z [JP 61/200,151] discloses thermoplastic compositions comprising from 5 to 95 weight percent of a block copolymer and from 95 to 5 weight percent of a thermoplastic polymer (e.g. ABS). The block copolymer is derived from coupling an aromatic vinyl polymer block with an aromatic vinyl monomer-conjugated diene copolymer block. The subject thermoplastic compositions apparently have improved impact strength.

Chemical Abstracts 112:8285y [JP 61/291,610] discloses the use of "impact modifiers" for thermoplastic polymers. The modifiers are basically similar to the block copolymer disclosed by Chemical Abstracts 106:85901z.

Chemical Abstracts 99:196070j [JP 58/122,954] discloses improvement of anisotropy of a styrene hydrocarbon-conjugated diene block copolymer by blending it with a styrene-methacrylic ester copolymer. Such a blend, when extruded to form a molded plate, apparently possesses superior physical properties.

Chemical Abstracts 111:8522c [JP 01/45614] discloses high-impact styrene polymer compositions comprising a major amount of a styrene (50 to 90 weight percent)-conjugated diene (50 to 10 weight percent) block copolymer and a minor amount of a styrene-based polymer (e.g. styrene-methyl methacrylate copolymer).

U.S. Pat. No. 5,290,862, assigned to the same assignee as that of the present invention, discloses a polymer alloy comprising (i) from 30 to 82 weight percent of a brittle polymer; (ii) from 3 to 50 weight percent of a rubbery polymer; and (iii) from 15 to 67 weight percent of a ductile polymer which is compatible with the rubbery polymer. The polymer alloy possesses a combination of improved properties, including improved impact strength. Typically these alloys have a Notched IZOD impact strength of greater than 0.5 foot pound/inch, preferably greater than 1.0 foot pound/inch, and may have a haze of less than 10, most preferably less than 5. The brittle polymer generally may have a molecular weight of about 220,000.

Even though the polymer alloy of the above U.S. Pat. No. 5,290,862 is adequate for certain end use applications, such as patio tumblers, requiring extremely low haze and good impact resistance, some critical applications may require a polymer alloy material with improved low haze with improved toughness and stiffness and/or improved toughness with excellent transparency.

SUMMARY OF THE INVENTION

The invention has met the above need. The invention provides an improved tough and transparent polymer alloy comprising:

from 90 to 20 weight percent of a brittle polymer;

from 0 to 60 weight percent of a rubbery polymer; and from 0 to 80 weight percent of a ductile polymer whereby the ductile polymer and the rubbery polymer are compatible; and greater than 0.4 weight percent of a plasticizer.

The brittle polymer has a weight average molecular weight greater than 180,000. In a first embodiment, the weight average molecular weight is greater than 220,000, preferably ranging between 270,000 and 300,000, and most preferably is 280,000. In a second embodiment of the invention, the weight average molecular weight ranges between about 190,000 and 300,000; and preferably ranges between 195,000 and 270,000. Both the first and the second embodiments comprise the brittle polymer and the plasticizer and either the rubbery polymer or the ductile polymer or both.

The polymer alloy of the first embodiment is comprised of from about 80 to 20 weight percent, preferably from about 70 to about 40 weight percent, and most preferably, about 50 to about 55 weight percent of the brittle polymer; from 0 to about 3 weight percent, and more preferably, 0 weight percent of the rubbery polymer; from about 20 to 80 weight percent, preferably from about 30 to 60 weight percent, and most preferably about 50 to about 45 weight percent of the ductile polymer; and from about 0.5 to about 3.0 weight percent, preferably from about 1 to about 2 weight percent, and most preferably about 1.5 weight percent of plasticizer.

The polymer alloy of the second embodiment is comprised of from about 80 to 20 weight percent, preferably from about 70 to 50 weight percent, and most preferably, from about 65 to about 55 weight percent of the brittle polymer; from about 5 to about 60 weight percent, preferably from about 5 to about 20 weight percent, and most preferably from about 8 to about 12 weight percent of the rubbery polymer; from about 0 to about 60 weight percent, more preferably from about 20 to about 40 weight percent; and most preferably from about 25 to about 35 weight percent of the ductile polymer; and greater than 0.4 weight percent, more preferably from about 0.5 to about 3.0 weight percent, and most preferably from about 0.7 to about 1.5 weight percent of the plasticizer.

The brittle polymer preferably is a copolymer of a styrene and methyl methacrylate and preferably, the plasticizer is mineral oil. The plasticizer can be part of any one of the polymers comprising the polymer alloy or it can be blended along with the polymers to form the polymer alloy of the invention. Preferably, the plasticizer is part of the brittle polymer and resides in the brittle polymer prior to the brittle polymer being blended with the other polymer components of the polymer alloy of the invention.

The ductile polymer preferably is a styrene butadiene block copolymer and may be present in the polymer alloy in an amount ranging from about 30 to about 60 weight percent. Preferably, the butadiene is present in this styrene butadiene block copolymer in an amount ranging between 20 to 35 weight percent, preferably from about 24 to about 26 weight percent, and more preferably, about 25 weight percent.

The rubbery polymer preferably is a styrene butadiene block copolymer having 55 to 70 weight percent butadiene.

The polymer alloys of the invention have improved low haze with improved toughness and stiffness and/or improved toughness with excellent transparency. For the first embodiment, when the indices of refraction of the different phases of the polymer alloy formed by the polymers and the plasticizer are matched within a + or −0.005, the haze will be less than 5%; when matched within a + or −0.002 the haze will be less than 3%, and more preferably the haze will be less than 1.5%. For the second embodiment, when the indices of refraction of the different phases of the polymer alloy formed by the polymers and the plasticizer are matched within a + or −0.005, the haze will be less than 10%; when matched within a + or −0.002 the haze will be between 1% and 4%.

The polymer alloy of the invention has a Notched IZOD impact strength ranging between about 1.0 to about 6.0, and preferably, ranging between about 2.0 and 4.5 foot pound per inch measured according to ASTM D-256.

These and other objects of the invention will be better appreciated and understood by those skilled in the art from the following description and appended claims.

DETAILED DESCRIPTION OF THE INVENTION

The polymer alloy of the present invention is an improvement of the polymer alloy described and claimed in the aforesaid U.S. Pat. No. 5,290,862, the teachings of which are incorporated herein by reference.

As used in this specification, the term "brittle" means a polymer having an elongation at break up to 15%, preferably less than 10%, as measured by ASTM D-638. The term "ductile" means a polymer having an elongation at break greater than 15%, as measured by ASTM D-638. The term "rubbery" means a natural or synthetic polymer, which at room temperature can be stretched to at least twice its original length, and upon immediate release of the stress, will return to its approximate original length. The term "compatible" means two or more polymers that have good interfacial adhesion (for example, the blended polymers exhibit physical properties approximating those expected from the rule of mixtures). The term "miscible" means two or more polymers which, when blended form a single phase that remains clear, even if the refractive indices of the polymers do not match.

The polymer alloy of the invention is comprised generally of a brittle polymer with a weight average molecular weight greater than 180,000; a rubbery polymer; and/or a ductile polymer; and a plasticizer in an amount greater than 0.4 weight % based on the total weight of the polymer alloy and preferably residing in the brittle polymer.

The brittle polymer used in the improved polymer alloy of the invention may be selected from the group of polymers consisting of polymers comprising:

(i) from 80 to 45 weight percent of one or more $C_{8-12}$ vinyl aromatic monomers which are unsubstituted or substituted by a $C_{1-4}$ alkyl radical;

(ii) from 20 to 55, weight percent of one or more $C_{1-6}$ alkyl esters of $C_{3-6}$ ethylenically unsaturated carboxylic acids; and (iii) from 0 to 5 weight percent of one or more $C_{3-6}$ ethylenically unsaturated carboxylic acids or anhydrides.

The $C_{8-12}$ vinyl aromatic monomer suitable for use in the brittle polymer component is not particularly restricted and may be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. The preferred $C_{8-12}$ vinyl aromatic monomer is styrene.

The choice of $C_{1-6}$ alkyl ester of a $C_{3-6}$ ethyenically unsaturated carboxylic acid for use in producing the brittle polymer is not particularly restricted. Non-limiting suitable examples of alkyl esters include acrylic ester, methyl methacrylate, methyl acrylate, ethyl acrylate, ethyl methacrylate, butyl acrylate and butyl methacrylate. The preferred alkyl ester is methyl methacrylate.

A brittle polymer suitable for use in the polymer alloy of the invention is a copolymer of styrene and methyl methacrylate (SMMA). Preferably, such a copolymer comprises from about 80 to about 45 weight percent, preferably from about 80 to about 65 weight percent, styrene, and from about 20 to about 55 weight percent, preferably from about 20 to about 35 weight percent, methyl methacrylate (MMA). Such a copolymer is commercially available from NOVA Chemicals Inc. under the trademark NAS 90.

The production of a brittle polymer suitable for use in the polymer alloy of the present invention is within the purview of a person skilled in the art. Such polymers may be produced by suspension, solution, emulsion, or bulk polymerization. This brittle polymer may be made in a reactor in which the plasticizer, especially if mineral oil, can also be added.

The brittle polymer suitable for use in the polymer alloy of the present invention has a weight average molecular weight greater than 180,000. In a first embodiment, the weight average molecular weight of the brittle polymer is greater than 220,000, preferably between about 270,000 to about 300,000, and most preferably about 280,000. In the second embodiment, the weight average molecular weight of the brittle polymer is greater than 180,000, preferably between about 190,000 and 300,000, and most preferably between about 195,000 and 270,000. In some end-use applications, the weight average molecular weight may be as high as 400,000.

The method for producing a polymer alloy with molecular weights of this magnitude are well known to those skilled in the art. For example, a desired molecular weight can be obtained by varying the conditions of the reactor in which the brittle polymer is polymerized, i.e. temperature, amount and type of initiator, and the type of polymerization process.

The inventors have found that by increasing the weight average molecular weight of the brittle polymer, and by adding a plasticizer, such as mineral oil, to the polymer alloy of the invention, very little or no rubbery polymer or ductile polymer may be needed in the polymer alloy in order to provide a tough, transparent high impact alloy with an acceptable Notched IZOD value and with very little haze. More specifically, the inventors have found that the combination of increasing the weight average molecular weight of the brittle polymer and adding the plasticizer to the polymer alloy increases 1) the efficiency of the rubbery and/or ductile components and 2) the toughness of the polymer alloy when compared to only increasing the molecular weight of the brittle polymer. This improved efficiency of the rubbery and ductile polymers allows lower amounts of these components to be used in the polymer alloy of the invention or allows one of these components to be eliminated from the polymer alloy of the invention. Thus, the negative effects which are usually associated with high amounts of these two components, which relate to "haze" and/or "stiffness" of the polymer alloy are lessened or decreased.

In a broad aspect of the invention, the brittle polymer is used in the polymer alloy in an amount from 90 to 20 weight percent, based on the total weight of the polymer alloy. In the first embodiment, this amount will range from about 80 to 20 weight percent, more preferably from about 70 to 40 weight percent, and most preferably, from about 50 to about 55 weight percent, based on the total weight of the polymer alloy, and the weight average molecular weight is greater than 220,000, more preferably between 270,000 and 300,000, and most preferably, is about 280,000.

In the second embodiment, the amount of brittle polymer ranges between about 80 to 20 weight percent, more preferably, 70 to 50 weight percent, and most preferably, from about 65 to about 55 weight percent, based on the total weight of the polymer alloy, and the weight average molecular weight is greater than 180,000, more preferably is between about 190,000 and 300,000, and most preferably, ranges between about 195,000 and 270,000.

Preferably, the ductile polymer of the polymer alloy ranges between about 0 to about 80 weight percent. This ductile polymer preferably is derived from 65 to 80 weight percent of one or more $C_{8-12}$ vinyl aromatic monomers; and 35 to 20 weight percent of one or more $C_{4-6}$ conjugated diolefins.

A ductile polymer suitable for use in the polymer alloy of the present invention is a tapered, linear or radial di-block (vinyl aromatic monomer-conjugated diene) or tri-block (vinyl aromatic monomer-conjugated diene-vinyl aromatic monomer) copolymer. The production of such copolymers is known to those skilled in the art. Such polymers can be produced by living solution polymerization (e.g. using a lithium catalyst). Examples of suitable ductile polymers for use in the present invention are available from Chevron-Phillips, Kraton, and AtoFina.

In the first embodiment, the ductile polymer of the polymer alloy ranges from between 20 to 80 weight percent, preferably from between 30 to 60 weight percent, and most preferably, is about 45 to 50 weight percent. In the second embodiment, the ductile polymer of the polymer alloy ranges between 0 to 60 weight percent, preferably between 20 to 40 weight percent, and most preferably ranges between 25 to 35 weight percent.

The rubbery polymer of the polymer alloy broadly ranges between about 0 to about 60 weight percent based on the total weight of the polymer alloy. This rubbery polymer preferably is derived from 30 to 45 weight percent of one or more $C_{8-12}$ vinyl aromatic monomers and from 70 to 55 weight percent of one or more $C_{4-6}$ conjugated diolefins.

A rubbery polymer suitable for use in the present polymer alloy may be a linear, tapered, or radial di-block (aromatic vinyl monomer-conjugated diene) or a tri-block copolymer (vinyl aromatic monomer-conjugated diene-vinyl aromatic monomer). As is known in the art, a tapered di-block copolymer is a copolymer comprising a block which becomes progressively rich in one of the constituent monomers in a segment (typically, the end) of the block.

The process by which such a tapered copolymer is obtained is similar to the process by which block copolymers are obtained except that there is an incremental adjustment in the monomer feed (e.g. richer or poorer in vinyl aromatic/conjugate diolefin) to produce a block polymer which is "tapered". Examples of suitable rubbery polymers for use in the present polymer alloys are commercially available from Ato-Fina, Dexco Polymers, and Firestone Synthetic Rubber and Latex Company.

In the first embodiment, the amount of rubbery polymer more preferably, ranges from about 0 to about 3 weight percent, most preferably, 0 weight percent, based on the total weight of the polymer alloy. In the second embodiment, the amount of rubbery polymer ranges from about 5 to about 60 weight percent, more preferably, from about 5 to about 20 weight percent, and most preferably, from about 8 to 12 weight percent, based on the total weight of the polymer alloy.

Suitable $C_{8-12}$ vinyl aromatic monomers for use in the ductile polymer and the rubbery polymer of the present invention are not particularly restricted and may be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. A preferred $C_{8-12}$ vinyl aromatic monomer is styrene. Generally, the ductile polymer will contain a larger amount of vinyl aromatic monomer, typically in the range from 65 to 80 weight percent; and the rubbery polymer will contain lower amounts of vinyl aromatic monomer, typically in the range 30 to 45 weight percent.

The $C_{4-6}$ conjugated diolefin suitable for use in the ductile polymer and the rubbery polymer of the polymer alloy of the present invention is not particularly restricted and may be unsubstituted or substituted by a chlorine atom. Preferably, the $C_{4-6}$ conjugated diolefin is selected from the group comprising 1,3-butadiene and isoprene. The preferred diolefin, particularly for the ductile polymer is butadiene. Thus, the preferred ductile polymer is a styrene butadiene block copolymer. The preferred diolefin particularly for the rubbery polymer is butadiene, and thus the preferred rubbery polymer is a styrene butadiene block copolymer. Generally, the amount of the $C_{4-6}$ conjugated diolefin in the rubbery polymer will range from about 55 to about 70 weight percent based on the total weight of the rubbery polymer. The amount of the $C_{4-6}$ conjugated diolefin in the ductile polymer will range from about 20 to about 35 weight percent, based on the total weight of the ductile polymer.

If a rubbery polymer and the ductile polymer are both used in the polymer alloy of the present invention, then the rubbery and ductile polymers should at least be compatible. Preferably, the polymers will be miscible, as defined herein.

The plasticizer is used in the polymer alloy of the invention in an amount greater than 0.4 weight percent based on the total weight of the polymer alloy. More specifically, the amount of plasticizer used in the polymer alloy of the first embodiment will range from about 0.5 to about 3.0 weight percent, more preferably between about 1.0 to about 2.0 weight percent, and most preferably, about 1.5 weight percent. The amount of plasticizer used in the polymer alloy of the second embodiment will be greater than 0.4, preferably from about 0.5 to about 3.0 weight percent, most preferably between about 0.7 to about 1.5 weight percent.

The plasticizer is not particularly limited and a suitable plasticizer may be selected from conventional plasticiziers used for thermoplastic acrylic resins as taught in U.S. Pat. No. 6,280,835. For example, plasticizers having good compatibility with the brittle polymer, the rubbery polymer, and the ductile polymer of the invention can be used. Examples of such plasticizers include alkyl benzyl phthalates, such as octyl benzyl phthalate and myristyl benzyl phthalate; dialkyl phthalates, such as dibutyl phthalate, dihexyl phthalate, and dioctyl phthalate; esters of phosphoric acid, such as tricresyl phosphate and trioctyl phosphate; esters of fatty acids, such as dibutyl sebacate and acetyl tributyl citrate; polyesters, such as polyesters derived from adipic acid, polyesters derived from sebacic acid, and polyesters derived from phthalic acid; derivatives of glycols, such as diethylene glycol dibenzoate, dipropylene glycol dibenzoate, and triethylene glycol di(2-ethylhexoate; derivatives of glycerol, such as glycerol triacetate and glycerol tributyrate; and epoxy derivatives, such as epoxidized soy bean oil.

The plasticizer may be selected from the group consisting of mineral oil, vegetable oil, animal oil, synthetic oil, silicone oil, and fluorinated oil. Preferably, the plasticizer used in the invention is mineral oil.

The plasticizer can be part of any one of the polymers comprising the polymer alloy or it can be blended along with the polymers to form the polymer alloy of the invention. That is, the plasticizer can be added to any of the polymers during its production or it can be compounded into any of the polymers in a separate step or it can be compounded along with the polymers during the production of the polymer alloy of the invention or it can be added using a combination of these methods. Preferably, the plasticizer is blended with the brittle polymer, more preferably the plasticizer is added during the production of the brittle polymer, and preferably, the plasticizer resides in the brittle polymer when the brittle polymer is added to or compounded with the rubbery polymer and/or the ductile polymer to form the polymer alloy.

The rubbery and ductile phases are at least compatible. That is, these components of the polymer alloy of the invention will have good interfacial adhesion. Under stress they will not delaminate. Preferably, the rubbery and ductile components are miscible. That is, when blended they will form a clear component, whether or not their refractive indices are matched or close.

The components of the polymer alloy, i.e. the brittle polymer, the rubbery polymer, the ductile polymer and the plasticizer, constitute different phases within the polymer alloy. Preferably, only two different phases will be formed. The amounts of these components in each phase will preferably be optimized so that the refractive indices of the different phases match each other. The refractive index of the polymer alloy of the invention will depend on the reflective indices of the individual polymers and on the ratio of the individual polymers in the polymer alloy. Likewise, the refractive index of each phase will depend on the refractive indices of the individual polymers and on the ratio of the individual polymers within each phase.

The plasticizer, particularly if the plasticizer is mineral oil can easily migrate phase to phase depending on the amount and nature of the individual polymers. This migration will affect the apparent refractive index of each phase. This migration of the plasticizer has to be taken into account in order to get the refractive indices of the phases each composed of several components, to match. By measuring the haze of various formulations, the nature of the migration can be understood and used to develop the clearest formulations, i.e. formulations that create the best clarity and lowest haze.

As taught herein above, the brittle polymer, the ductile polymer, and the rubbery polymer are preferably copolymers, i.e. consisting of more than one monomer. The refractive index of a copolymer depends on the ratio of the individual monomers in the copolymer. In this instance, adjustments can be made to the refractive index of either phase by changing the copolymer ratio during polymerization, if feasible, or by blending like copolymers of different ratios, if they are miscible. In this way, clear blends with a balance of toughness, stiffness and impact resistance can be obtained.

For the first embodiment of the invention, when the refractive indices of the different phases of the polymer alloy match within + or −0.005, the material will be transparent with a haze less than 5%. When the refractive indices of the different phases of the polymer alloy match within + or −0.002, the material will have excellent clarity and a very low haze less than 3%, preferably less than 1.5%.

For the second embodiment, when the refractive indices of the different phases of the polymer alloy match within + or −0.005, the material will be transparent with a haze less than 10%. When the refractive indices of the different phases match within + or −0.002, the material will have a very low haze preferably between 1% and 4%.

The polymer alloy of the invention has a Notched IZOD impact strength ranging between about 1.0 to about 6.0, and preferably, ranging between about 2.0 and 4.5 foot pound per inch measured according to ASTM D-256.

The above is not intended to place any limitation on the order of mixing the polymers. It is not necessary to have a specific sequenced addition of polymers to the mixer.

In preparing the polymer alloy of the present invention, solution blending of the components is generally not useful, as it is difficult to find a common solvent for each polymer in the blend. As stated herein above, preferably, the plasticizer is blended with the brittle polymer prior to the brittle polymer being blended with the other polymers and the plasticizer resides in the brittle polymer when the brittle polymer is blended or mixed with the other polymers of the polymer alloy. Typically, adequate mixing of the several polymers of the polymer alloy of the invention can be achieved by mechanical mixing in a suitable intensive mixer, preferably a single screw or twin screw extruder. If a single screw extruder is used, it should preferably be equipped with a modified mixing section to ensure adequate mixing of the components. Examples of common modified mixing sections are the Maddock mixing head and various designs from the Spirex Company such as the "Z-mixer".

Operation of an extruder to achieve this end is within the purview of a person skilled in the art. For example, for an inch and a half extruder having an L to D ratio of about 24:1, the extruder is operated at from 30 to 150, preferably from 50 to 135, most preferably from 75 to 100, RPM. During such operation, the barrel temperature of the extruder is in the range of from 190 to 240° C., preferably from 200 to 220° C.

Both the ductile polymer and the rubbery polymer may be individually fed to the extruder. Alternatively they may be mixed together and then fed to the extruder, or mixed together and then extruded, and then chopped into pellets. The resulting pellets may then be extruded with the brittle polymer that contains the mineral oil. However, the components of the polymer alloy of the present invention may also be dry-blended in, for example, a tumbler blender and then extruded. In an alternative procedure, the polymers may be fed directly to an extruder using loss-in-weight feeders for accurate composition control. As is common for twin screw extrusion, some of the polymers and/or the plasticizer may be accurately metered into the extruder downstream of the main feed zone.

In a broad aspect of the invention, the brittle polymer will range from about 20 to 90 weight percent with a weight average molecular weight greater than 180,000 and comprising from 80 to 45 weight percent of one or more $C_{8-12}$ vinyl aromatic monomers (preferably, styrene) and from 20 to 55 weight percent of one or more $C_{1-6}$ alkyl esters of $C_{3-6}$ ethylenically unsaturated carboxylic acids (preferably, methyl methylacrylate (MMA)) and from 0 to 5 weight % of one or more $C_{3-6}$ ethylenically unsaturated carboxylic acids or anhydrides; the rubbery polymer will range from about 0 to 60 weight percent; the ductile polymer will range from about 0 to about 80 weight percent; and the plasticizer will be greater than 0.4 weight percent, based on the total weight of the polymer alloy.

The invention will be illustrated with reference to the following Examples, which should not be construed so as to limit the scope of the present invention.

EXAMPLES

Example 1

A summary of the blends of the polymer alloy of Embodiments 1 and 2 of the invention is shown in Table 1. These blends contain styrene-methyl methacrylate (SMMA) as the brittle polymer in the amounts shown in Table 1.

Two commercially available samples, Examples A and E, of polymer alloys of brittle polymer, ductile polymer, and rubbery polymers available from NOVA Chemicals, Inc., under the trademark ZYLAR® and identified as prior art in Table 2 were injection molded into test pieces for conducting physical tests. These polymer alloys come within the composition ranges specified in U.S. Pat. No. 5,294,677 that is owned by the assignee of the present invention.

Test pieces for embodiments 1 and 2 containing the amounts/weights in the respective "Specific Range" columns in Table 1 were also prepared and tested. The mineral oil resided in the brittle polymer. The components for embodiments 1 and 2 were in the form of pellets and were fed, in the desired amounts, to a twin screw extruder. Pre-drying of the resin components was not required. The extruder was operated at 75-100 RPM and a temperature in the range of 200 to 220° C. The mixture was extruded, chopped into pellets, and subsequently injection molded into a number of suitable specimens.

The following physical tests were then performed on both the ZYLAR® test specimens and the specimens of the invention:

| Test | Identification |
|---|---|
| Haze | ASTM D-1003 |
| Notched IZOD | ASTM D-256 |
| Tensile Properties | ASTM D-638 |
| Elongation at Break | ASTM D-638 |

A comparison of the physical properties of polymer alloy of the ZYLAR® products with the polymer alloy of the invention is shown in Table 2. For embodiment 2, both the measured result for the high rubber end of the Specific Range (i.e. 34 weight percent ductile and 10 weight percent rubbery) and expected results for the lower rubber limit (i.e. approximately 25 weight percent ductile and 8 weight percent rubbery), are given in Table 2. These are Example C and Example D, respectively.

TABLE 1

| FORMULATION | Embodiment 1 | | | Embodiment 2 | | |
|---|---|---|---|---|---|---|
| | Specific Range | Preferred Range | Broad Range | Specific Range | Preferred Range | Broad Range |
| % (wt.) brittle | 50–55 | 40–70 | 20–80 | 55–65 | 50–70 | 20–80 |
| % (wt.) ductile | 45–50 | 30–60 | 20–80 | 25–35 | 20–40 | 0–60 |
| % (wt.) rubbery | 0 | 0–3 | 0–3 | 8–12 | 5–20 | 5–60 |
| % (wt) oil | 1.5 | 1–2 | 0.5–3.0 | 0.7–1.5 | 0.5–3.0 | >0.5 |
| SMMA (MW) | 280,000 | 270,000–300,000 | >220,000 | 195,000–270,000 | 190,000–300,000 | >180,000 |
| (MMA wt %) | 20–26 | 20–35 | 20–55 | 30–35 | 20–35 | 20–55 |

TABLE 2

| | | Prior Art Example A | Invention Embodiment 1 (measured) Example B | Invention Embodiment 2 (measured) Example C | Invention Embodiment 2- Low Rubber (expected results) Example D | Prior Art Example E |
|---|---|---|---|---|---|---|
| Haze (0.1") | % | 1.0 | 1.0 | 2.0 | 2.0 | 2.0 |
| IZOD | Ft-lb/in | 0.45 | 3.5 | 4.0 | 2.0 | 2.5 |
| Falling Dart Peak Force | lb. | 200 | 450 | 700 | 500 | 500 |
| Tensile Strength | psi | 5,200 | 3,500 | 3,500 | 4,800 | 4,200 |

TABLE 2-continued

|  |  | Prior Art Example A | Invention Embodiment 1 (measured) Example B | Invention Embodiment 2 (measured) Example C | Invention Embodiment 2- Low Rubber (expected results) Example D | Prior Art Example E |
|---|---|---|---|---|---|---|
| Elongation | % | 32 | 85 | 70 | 60 | 80 |
| Tensile Modulus | psi | 330,000 | 320,000 | 290,000 | 380,000 | 319,000 |

When Example A (prior art) is compared with Example B (invention) and when Example E (prior art) is compared with Example C (invention), it is observed that the polymer alloy of the invention has an improved toughness (IZOD and Falling Dart Force) with no loss in clarity (Haze). Alternatively, when Example E (prior art) is compared with Example D (invention), it is observed that the polymer alloy of the invention having an improved stiffness, as measured by Tensile Modulus, i.e. 319,000 (Example E) verses 380,000 (Example D) can be prepared with equivalent toughness i.e. a Falling Dart Peak Force of 500 psi for both Example E (prior art) and Example D (invention) and almost an equivalent IZOD value i.e. 2.5 for Example E verses an IZOD value of 2.0 for Example D.

In general, as is evident from the test specimens in Table 2 above, the toughness of the specimens of the invention, as measured by both IZOD impact strength and from Falling Dart Peak Force, show an improved balance between toughness, low haze and stiffness compared to the polymer alloys of the prior art.

Example 2

A comparison specimen (No. 1) and several polymer alloy specimens of the invention (Nos. 2-8) were prepared and were injection molded. Physical testing was performed similar to that explained in Example 1.

The specimens were comprised of the following components:

| COMPONENT | |
|---|---|
| Brittle Polymer: | A copolymer derived from SMMA (styrene - 70 weight percent and methyl methacrylate - 30 weight percent). Experimental samples with different molecular weights. Brittle polymer also contained the mineral oil (0 to 3.5 weight percent) prior to blending of polymer alloy. |
| Ductile Polymer: | A tri-block copolymer derived from styrene (75 weight percent) and butadiene (25 weight percent), i.e. a styrene butadiene block copolymer. |
| Rubbery Polymer: | A tapered polymer derived from styrene (45 weight percent) and butadiene (55 weight percent), i.e. a styrene butadiene block copolymer. |

The amount of each component in the specimens and the results of the physical testing are provided in Table 3, wherein all units are in weight percent, unless otherwise indicated.

TABLE 3

| | Run # | | | | | | | |
|---|---|---|---|---|---|---|---|---|
| Sample ID | 1 | 2 | 3 | 4 | 5 | 6 | 7 | 8 |
| Formulation | | | | | | | | |
| % brittle (SMMA) | 60 | 58.5 | 57.9 | 57.1 | 55.8 | 50.8 | 55.5 | 66.1 |
| % ductile | 28.4 | 28.4 | 28.4 | 31 | 33.5 | 37.5 | 35.6 | 27.6 |
| % rubbery | 11.6 | 11.6 | 11.6 | 10.4 | 9.3 | 10.4 | 8.3 | 5.6 |
| % mineral oil | 0 | 1.5 | 2.1 | 1.5 | 1.4 | 1.3 | 0.6 | 0.7 |
| SMMA MW | 194,000 | 194,000 | 254,000 | 194,000 | 194,000 | 194,000 | 194,000 | 194,000 |
| Net butadiene % in alloy | 13.5 | 13.5 | 13.5 | 13.5 | 13.5 | 15.0 | 13.5 | 10.0 |
| Properties | | | | | | | | |
| Haze (0.10")( %) | 2.3 | 4.3 | 7.8 | 2.6 | 22 | 2.3 | 1.9 | 3.3 |
| Melt (200/5) (g/10 min) | 4.8 | 6.2 | 4.7 | n/a | n/a | n/a | n/a | n/a |
| VICAT (° C.) | 98 | 95.3 | 94.8 | 95.8 | 96 | 93.4 | N/a | n/a |
| IZOD (Notched)(ft-lb/in) | 2.5 | 3.4 | 2.9 | 3.7 | 3.8 | 4.5 | 3.6 | 0.4 |
| Tensile Strength (psi) | 4150 | 3400 | 2800 | 3400 | 3470 | 3440 | 3990 | 4920 |
| Elongation @fail (%) | 78 | 64 | 50 | 66 | 70 | 70 | 78 | 52 |
| Tensile Modulus (psi) | 294,000 | 268,000 | 271,000 | 286,000 | 292,000 | 272,000 | 347,000 | 391,000 |
| Falling Dart Impact Test | | | | | | | | |
| Peak Energy (ft-lb) | 7 | 23 | 33 | 23 | 14 | 32 | 9 | 5 |
| Total Energy (ft-lb) | 13.4 | 53 | 55 | 48 | 32 | 80 | 36 | 10 |
| Peak Force (lb) | 520 | 1000 (no break) | 1150 (no break) | 960 | 680 | 1130 (no break) | 580 (no break) | 470 (no break) |

(n/a-results not available)

As is evident from these specimens 1 through 8, the addition of mineral oil and increasing the molecular weight of the brittle polymer gives a good balance of impact, tensile strength and tensile modulus, and acceptable low haze. A comparison of specimen 1 to specimen 2 shows that the addition of mineral oil increases toughness. A comparison of specimen 2 to specimen 4 demonstrates that adjusting the ratio of ductile and rubbery polymers can improve the refractive index match of the phases and reduce haze. Specimens 4 through 7, which are still within the scope of the invention, show that a reduction in the rubbery polymer component can produce a tough (IZOD) but still stiff (Tensile Strength) product with acceptable low haze compared to specimen 1 that contains no mineral oil and that has a greater amount of rubbery polymer component. Even though specimen 8 has a low Notched IZOD value, it still has good practical toughness (52% Elongation and 470 pounds Falling Dart Peak Force), as well as low haze and extremely high stiffness (390,000 psi Tensile Modulus).

This Example 2 therefore gives an indication as to how the addition of mineral oil and a high molecular weight of the brittle polymer increase the toughening efficiency of the rubber phase (ductile and rubbery polymers).

Example 3

A comparison specimen (No. 1) and several polymer alloy specimens of the invention (Nos. 2-6) were prepared and injection molded. Physical testing was performed similar to that explained in Example 1.

The specimens were comprised of the following components:

| COMPONENT | |
| --- | --- |
| Brittle Polymer: | A copolymer derived from SMMA (styrene - 79 weight percent and methyl methacrylate - 21 weight percent). Experimental samples with different molecular weights. Brittle polymer also contained the mineral oil (0 to 5 weight percent) prior to blending of polymer alloy. |
| Ductile Polymer: | A tri-block copolymer derived from styrene (75 weight percent) and butadiene (25 weight percent), i.e. a styrene |

-continued

| COMPONENT | |
| --- | --- |
| | butadiene block copolymer. The copolymer is available commercially from Chevron-Phillips as K-Resin ® KR03. |

Each specimen was a blend of 50 weight percent brittle polymer and 50 weight percent ductile polymer. The results of the physical testing are provided in Table 4.

TABLE 4

| | | Run No. | | | | | |
| --- | --- | --- | --- | --- | --- | --- | --- |
| | | 1 | 2 | 3 | 4 | 5 | 6 |
| Molecular Weight | Mw of SMMA | 220000 | 232300 | 264000 | 268500 | 290700 | 291000 |
| Mineral Oil | (wt % in alloy) | 0 | 1.41 | 1.37 | 2.31 | 2.3 | 1.64 |
| Falling Dart Impact-Total Energy | ft-lbs | 1.4 | 2.7 | 3.3 | 6.3 | 7.3 | 4.8 |
| Falling Dart Impact-Peak Force | lbs | 181.1 | 212.6 | 246.1 | 343.8 | 346.2 | 308.7 |
| Notched IZOD | ft-lbs/in | 0.38 | 0.43 | 0.89 | 4.96 | 5.28 | 3.35 |
| Haze | % | 1 | 3.8 | 1.8 | 2.9 | 3.5 | 2 |
| VICAT | C | 98.8 | 97.9 | 98 | 96.4 | 96.2 | 97.4 |
| Melt Index | g/10 min | 4.35 | 3.93 | 3.77 | 4.27 | 4.0 | 3.57 |

As is evident from specimens 2 through 6, the addition of mineral oil and an increase in the molecular weight of the brittle polymer provide a significant increase in the toughness of the polymer alloy as measured by Notched IZOD and Falling Dart Impact Total Energy and Peak Force. In particular, Notched IZOD values well above 1 ft-lb/in were obtained for speciments 4-6, while the blend (specimen 1) without mineral oil and a lower weight average molecular weight (220,000) obtained a Notched IZOD value of 0.38. Also for the specimens of the invention, the Falling Dart Impact Total Energy values increased by almost an order of magnitude compared to that of specimen 1.

The haze can be further improved by adjusting the methyl methacrylate (MMA) content of brittle component in order to improve the refractive index match.

INDUSTRIAL APPLICABILITY

The product of the present invention has improved low haze and improved transparency with improved toughness and/or stiffness compared to the polymer alloys of the prior art. The polymer alloy of the present invention should be suitable in critical applications requiring clear and tough parts, for example, in the manufacture of appliance housings, household accessories, and medical parts, particularly see-through, durable, and impact-resistant, medical components.

The invention is important in response to the growing trend in many markets to replace opaque parts with clear components, and for aesthetic, design, visibility, and security reasons. The invention provides additional options at a lower cost and is easier to process (drop-in) with the customer's existing equipment.

While the present invention has been particularly set forth in terms of specific embodiments thereof, it will be understood in view of the instant disclosure that numerous variations upon the invention are now enabled yet reside within the scope of the invention.

What is claimed is:

1. A polymer alloy comprising:
   from about 90 to 20 weight % of a brittle polymer with a weight average molecular weight greater than 180,000, and comprising:
   (i) from 80 to 45 weight % of one or more $C_{8-12}$ vinyl aromatic monomers;
   (ii) from 20 to 55 weight % of one or more $C_{1-6}$ alkyl esters of $C_{3-6}$ ethylenically unsaturated carboxylic acids; and
   (iii) from 0 to 5 weight % of one or more $C_{3-6}$ ethylenically unsaturated carboxylic acids or anhydrides;
   from about 0 to about 60 weight % of a tapered, linear or radial di- or tri-block rubbery polymer comprising:
   (i) from 30 to 45 weight % of one or more $C_{8-12}$ vinyl aromatic monomers; and
   (ii) from 70 to 55 weight % of one or more $C_{4-6}$ conjugated diolefins;
   from about 0 to about 80 weight % of a tapered, linear or radial di- or tri-block ductile polymer comprising:
   (i) from 65 to 80 weight % of one or more $C_{8-12}$ vinyl aromatic monomers; and
   (ii) from 35 to 20 weight % of one or more $C_{4-6}$ conjugated diolefins; and
   a plasticizer mixed into said brittle polymer in an amount greater than 0.4 weight % based on the total weight of the polymer alloy.

2. The polymer alloy of claim 1 comprising:
   from about 80 to 20 weight % of said brittle polymer with a weight average molecular weight greater than 220,000;
   from about 0 to about 3 weight % of said tapered, linear or radial di- or tri-block rubbery polymer;
   from about 20 to about 80 weight % of said tapered, linear or radial di- or tri-block ductile polymer; and
   from about 0.5 to about 3.0 weight % of said plasticizer.

3. The polymer alloy of claim 2 comprising:
   from about 70 to about 40 weight % of said brittle polymer with a weight average molecular weight ranging between about 270,000 to about 300,000;
   from about 0 to about 3 weight % of said tapered linear or radial di- or tri-block rubbery polymer;
   from about 30 to about 60 weight % of said tapered, linear or radial di- or tri-block ductile polymer; and
   from about 1.0 to about 2.0 weight % of said plasticizer.

4. The polymer alloy of claim 3 comprising:
   about 50 to 55 weight % of said brittle polymer with a weight average molecular weight of about 280,000;
   about 0 weight % of said tapered linear or radial di- or tri-block rubbery polymer;
   about 50 to 45 weight % of said tapered, linear or radial di- or tri-block ductile polymer; and
   about 1.5 weight % of said plasticizer.

5. The polymer alloy of claim 1 comprising:
   from about 80 to 20 weight % of said brittle polymer with a weight average molecular weight greater than 180,000;
   from about 5 to about 60 weight % of said tapered linear or radial di- or tri-block rubbery polymer;
   from about 0 to about 60 weight % of said tapered, linear or radial di- or tri-block ductile polymer; and
   greater than 0.4 weight % of said plasticizer.

6. The polymer alloy of claim 5 comprising:
   from about 70 to 50 weight % of said brittle polymer with a weight average molecular weight ranging between about 190,000 and 300,000;
   from about 5 to about 20 weight % of said tapered linear or radial di- or tri-block rubbery polymer;
   from about 20 to about 40 weight % of said tapered linear or radial di- or tri-block ductile polymer; and
   from about 0.5 to about 3.0 weight % of said plasticizer.

7. The polymer alloy of claim 6 comprising:
   from about 65 to about 55 weight % of said brittle polymer with a weight average molecular weight ranging between 195,000 and 270,000;
   from about 8 to about 12 weight % of said tapered linear or radial di- or tri-block rubbery polymer;
   from about 25 to about 35 weight % of said tapered linear or radial di- or tri-block ductile polymer; and
   from about 0.7 to about 1.5 weight % of said plasticizer.

8. The polymer alloy of claim 1 wherein said weight average molecular weight of said brittle polymer is about 400,000.

9. The polymer alloy of claim 1 wherein in said brittle polymer said $C_{8-12}$ vinyl aromatic monomer is selected from the group consisting of styrene, α-methyl styrene, p-methyl styrene and t-butyl styrene.

10. The polymer alloy of claim 1 wherein in said brittle polymer said $C_{1-6}$ alkyl esters of $C_{3-6}$ ethylenically unsaturated carboxylic acid is selected from the group consisting of acrylic ester, methyl methacrylate, methyl acrylate, ethyl acrylate, ethyl methacrylate, butyl acrylate, and butyl methacrylate.

11. The polymer alloy of claim 1 wherein in said ductile polymer said one or more $C_{8-12}$ vinyl aromatic monomers is selected from the group consisting of styrene, α-methyl styrene, p-methyl styrene and t-butyl styrene, and said one or more $C_{4-6}$ conjugated diolefins is selected from the group consisting of butadiene and isoprene.

12. The polymer alloy of claim 1 wherein said brittle polymer is a copolymer of a styrene and methyl methacrylate.

13. The polymer alloy of claim 12 wherein said ductile polymer is a styrene butadiene block copolymer present in an amount ranging from about 30 to about 60 weight percent based on the total weight of the polymer alloy.

14. The polymer alloy of claim 13 wherein said styrene and methyl methacrylate copolymer of said brittle polymer is present in an amount ranging from about 50 to about 55 weight percent and said styrene butadiene block copolymer of said ductile polymer is present in said polymer alloy in an amount ranging from about 45 to about 50 weight percent, and wherein said rubbery polymer is present in an amount of 0 weight percent, and wherein said plasticizer is present in an amount of about 1.5 weight percent.

15. The polymer alloy of claim 13 wherein said butadiene in said styrene butadiene block copolymer of said ductile polymer is present in an amount ranging from about 20 to about 35 weight percent and wherein the amount of said methyl methylacrylate in said styrene and methyl methyacrylate copolymer is present in an amount ranging from about 20 to about 35 weight percent.

16. The polymer alloy of claim 1 wherein said plasticizer is selected from the group consisting of mineral oil, vegetable oil, animal oil, synthetic oil, silicone oil, and fluorinated oil.

17. The polymer alloy of claim 16 wherein said plasticizer is mineral oil.

18. The polymer alloy of claim 1 wherein said plasticizer ranges in the amount of about 1.0 to about 2.0 weight % based on the total weight of the polymer alloy.

19. The polymer alloy of claim 2 wherein the indices of refraction of the different phases of the polymer alloy are matched within a + or −0.005 with a haze less than 5%.

20. The polymer alloy of claim 2 wherein the indices of refraction of the different phases of the polymer alloy are matched within + or −0.002 with a haze less than 3%.

21. The polymer alloy of claim 2 wherein the indices of refraction of the different phases of the polymer alloy are matched within + or −0.002 with a haze less than 1.5%.

22. The polymer alloy of claim 5 wherein the indices of refraction of the different phases of the polymer alloy are matched within + or −0.005 with a haze less than 10%.

23. The polymer alloy of claim 5 wherein the indices of refraction of the different phases of the polymer alloy are matched within + or −00.02 with a haze between 1% and 4%.

24. The polymer alloy of claim 1 having a Notched IZOD impact strength ranging between about 1.0 and 6.0 ft-lb./in. measured according to ASTM D-256.

25. The polymer alloy of claim 24 having a Notched IZOD impact strength ranging between about 2.0 and 4.5 ft-lb./in. measured according to ASTM D-256.

26. An article made from the polymer alloy of claim 1.

27. A process for preparing a polymer alloy of claim 1 the steps comprising:

prior to forming said polymer alloy, blending said plasticizer into said brittle polymer wherein said plasticizer resides in said brittle polymer, and forming said polymer alloy by adding said brittle polymer and said plasticizer with a group of polymers selected from the group consisting of said rubbery polymer, said ductile polymer, and said rubbery polymer with said ductile polymer.

* * * * *